(12) United States Patent
Lyhne

(10) Patent No.: US 12,113,358 B2
(45) Date of Patent: Oct. 8, 2024

(54) METHODS AND SYSTEMS FOR CONTROLLING AN ENERGY STORAGE SYSTEM TO PROVIDE A FREQUENCY REGULATION SERVICE

(71) Applicant: VESTAS WIND SYSTEMS A/S, Aarhus N (DK)

(72) Inventor: Casper Hillerup Lyhne, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/538,514

(22) Filed: Dec. 13, 2023

(65) Prior Publication Data
US 2024/0195172 A1    Jun. 13, 2024

(30) Foreign Application Priority Data
Dec. 13, 2022   (DK) .......................... PA 2022 70606

(51) Int. Cl.
*H02J 3/00* (2006.01)
*H02J 3/24* (2006.01)
(Continued)

(52) U.S. Cl.
CPC ................ *H02J 3/00* (2013.01); *H02J 3/001* (2020.01); *H02J 3/241* (2020.01); *H02J 3/32* (2013.01);
(Continued)

(58) Field of Classification Search
CPC ............... H02J 3/00; H02J 3/001; H02J 3/004
See application file for complete search history.

(56) References Cited

U.S. PATENT DOCUMENTS 11,358,491 B2 * 6/2022 Kang ...................... B60L 50/61
2010/0090532 A1   4/2010 Shelton et al.
(Continued)

FOREIGN PATENT DOCUMENTS

CN      114172168 A    3/2022
CN      114552600 A    5/2022
(Continued)

OTHER PUBLICATIONS

Danish Patent and Trademark Office, 1st Technical Examination including the Search Report for Application PA 2022 70606 dated Jun. 28, 2023.
(Continued)

*Primary Examiner* — Adi Amrany
(74) *Attorney, Agent, or Firm* — Patterson + Sheridan, LLP

(57) ABSTRACT

According to an aspect of the invention there is provided a method of controlling an energy storage system to provide a frequency regulation service for a power network, to which the energy storage system is connected. The energy storage system is controlled according to one or more regulations of the power network to counteract frequency deviations within a frequency contingency deadband of the power network to provide the frequency regulation service for a service period. The energy storage system is one of a plurality of energy storage systems connected to the power network, each energy storage system being operated to counteract the frequency deviations according to the one or more regulations of the power network.

14 Claims, 6 Drawing Sheets

(51) Int. Cl.
*H02J 3/32* (2006.01)
*H02J 3/38* (2006.01)
(52) U.S. Cl.
CPC .............. *H02J 3/38* (2013.01); *H02J 3/381* (2013.01); *H02J 2203/10* (2020.01); *H02J 2300/28* (2020.01)

(56) References Cited

U.S. PATENT DOCUMENTS

| | | | | |
|---|---|---|---|---|
| 2014/0183961 | A1* | 7/2014 | Schrock | H02J 3/0012 |
| | | | | 307/102 |
| 2015/0184632 | A1* | 7/2015 | Sagi | F03D 7/048 |
| | | | | 290/44 |
| 2016/0197477 | A1* | 7/2016 | Majumder | H02J 3/14 |
| | | | | 307/24 |
| 2017/0141576 | A1 | 5/2017 | Gutenmann et al. | |
| 2018/0034286 | A1* | 2/2018 | Dorneanu | H02J 7/34 |
| 2018/0054061 | A1* | 2/2018 | Dorneanu | H02J 7/0063 |
| 2019/0245368 | A1* | 8/2019 | Baumgartner | H02J 3/12 |
| 2020/0153274 | A1* | 5/2020 | Münz | H02J 13/00007 |
| 2022/0121260 | A1* | 4/2022 | King | G06F 1/28 |
| 2022/0316443 | A1* | 10/2022 | Zhang | H02P 9/007 |
| 2024/0014667 | A1* | 1/2024 | Wu | H02J 7/0019 |
| 2024/0039286 | A1* | 2/2024 | Ishihara | H02J 3/48 |

FOREIGN PATENT DOCUMENTS

| | | |
|---|---|---|
| CN | 115102239 A | 9/2022 |
| KR | 20180110513 A | 10/2018 |

OTHER PUBLICATIONS

European Patent Office, Extended European Search Report for European Patent Application No. 23212174.9, dated Jul. 15, 2024.

Gkavanoudis et al. "An adaptive droop control method for balancing the Soc of distributed batteries in AC microgrids", 2016 IEEE 17TH Workshop On Control and Modeling for Power Electronics (Compel), IEEE, Jun. 27, 2016 (Jun. 27, 2016), pp. 1-6, XP032955307, DOI: 10.1109/COMPEL.2016.7556698 [retrieved on Aug. 30, 2016].

Delille et al.: "Dynamic Frequency Control Support by Energy Storage to Reduce the Impact of Wind and Solar Generation on Isolated Power System's Inertia", IEEE Transactions On Sustainable Energy, IEEE, USA, vol. 3, No. 4, Oct. 1, 2012 (Oct. 1, 2012), pp. 931-939, XP011462122, ISSN: 1949-3029, DOI: 10.1109/TSTE.2012.2205025.

Tan et al: "Primary frequency control with BESS considering adaptive Soc recovery", International Journal of Electrical Power & Energy Systems, Jordan Hill, Oxford, GB, vol. 117, Oct. 16, 2019 (Oct. 16, 2019), XP085985455, ISSN: 0142-0615, DOI: 10.1016/J.IJEPES.2019.105588 [retrieved on Oct. 16, 2019].

* cited by examiner

METHODS AND SYSTEMS FOR CONTROLLING AN ENERGY STORAGE SYSTEM TO PROVIDE A FREQUENCY REGULATION SERVICE

TECHNICAL FIELD

The present disclosure relates to methods and systems for controlling an energy storage system to provide a frequency regulation service, in particular a frequency regulation service within a frequency contingency deadband of a power network to which the energy storage system is connected. Aspects of the invention relate to a method, and to an energy storage system controller.

BACKGROUND

Regulators and operators of power networks expect connected power plants to adhere to a 'grid code' and to provide particular services to the power network.

For example, national or international power networks have a nominal frequency, also referred to as the utility or mains frequency, which is typically 50 Hz or 60 Hz. Some operators require power plants to support the power network when the frequency of the power network deviates from a normal operational range around the nominal frequency, also referred to as a frequency contingency deadband. Such changes in frequency are undesirable, as equipment to which power is supplied is configured to operate at a particular frequency with a relatively tight tolerance. Thus, where frequency deviates from the nominal frequency, even by less than 1 Hz, it is important to correct the deviation quickly, typically within a few seconds of the deviation at most.

In some cases, power plant operators offer frequency regulation services, such as frequency containment reserve, to further improve grid stability even while the network frequency remains within the frequency contingent deadband. For example, a power plant operator may agree to provide upregulation and/or downregulation services for a 24-hour period to counteract deviations from the nominal operating frequency of the power network. In this context upregulation means increasing power supply or decreasing power consumption of the power plant, while downregulation means decreasing power supply or increasing consumption of the power plant.

More recently, it has become possible for energy storage systems, such as battery energy storage systems, to participate in such frequency regulation services. However, energy storage systems have limited energy resources, which introduces a risk of unmitigated frequency deviations when the stored energy of the energy storage systems reaches an upper or lower limit.

It is an aim of the present invention to address one or more of the disadvantages associated with the prior art.

SUMMARY OF INVENTION

According to an aspect of the invention there is provided a method of controlling an energy storage system to provide a frequency regulation service for a power network, to which the energy storage system is connected. The energy storage system is controlled according to one or more regulations of the power network to counteract frequency deviations within a frequency contingency deadband of the power network to provide the frequency regulation service for a service period. The energy storage system is one of a plurality of energy storage systems connected to the power network, each energy storage system being operated to counteract the frequency deviations according to the one or more regulations of the power network.

In this context, it shall be appreciated that 'controlling the energy storage system according to the one or more regulations of the power network' refers to the control of the energy storage system according to the authoritative rule(s) prescribed for the power network that deal with procedure for operating the individual energy storage systems, and/or devices thereof, to counteract the frequency deviations.

The method comprises: determining an estimate of stored energy for each energy storage system at the start of the service period; and during the service period: obtaining a measurement indicative of a frequency level of the power network; detecting a frequency deviation requiring counteraction by the plurality of energy storage systems based on the indicated frequency level; modelling the response, according to the one or more regulations, of each energy storage system to the frequency deviation; estimating a remaining amount of stored energy at each energy storage system; and detecting a fault condition if the estimate of the remaining stored energy at each energy storage system is indicative of an inability of the plurality of energy storage systems to counteract a subsequent frequency deviation.

In this manner, the method allows for monitoring of the ability of the energy storage system to provide the frequency regulation service, and counteract subsequent frequency deviations, in the absence of real time measurements of the energy stored in the plurality of energy storage systems. The fault condition may be detected when the estimates of the energy stored at each energy storage system indicates that the energy storage systems is too high or too low such that there is a risk that the energy storage systems will fail to cumulatively provide a threshold power level for counteracting the subsequent deviation. Corrective action can therefore be triggered in advance to negate the possibility of an unmitigated frequency deviation.

Optionally, the fault condition is detected if the estimate of the remaining stored energy at each energy storage system is: (i) greater than or equal to an upper threshold; and/or (ii) less than or equal to a lower threshold.

In an example, the method may further comprise determining the upper threshold, and/or the lower threshold, for each energy storage system based on an upper energy limit, and/or a lower energy limit, for the frequency regulation service. Optionally, the upper energy limit corresponds to an absolute capacity of each energy storage system. Optionally, the lower energy limit corresponds to a fully depleted energy storage system.

In an example, the initial estimate of stored energy at each energy storage system is determined by measurement.

In an example, the initial estimate of stored energy at each energy storage system is determined based on one or more probabilistic functions. For example, the one or more probabilistic functions include at least one of: a random distribution; a binomial distribution; a (discrete) uniform distribution; and/or a Poisson distribution.

In an example, a model of the plurality of energy storage systems (connected to the power network) is used to model the response, according to the one or more regulations, of each energy storage system to the frequency deviation. The model may include one or more algorithms for estimating an active power level of each energy storage system based on: (i) the indicated frequency level of the connected power network, and (ii) a respective estimate of stored energy at that energy storage system.

Optionally, the model may include one or more power-frequency (P-f) curves for estimating the active power level of each energy storage system. Each P-f curve may comprise a baseline P-f curve for the frequency contingency deadband split into one or more sub-bands. Individual offset curves may be applied to one or more of the sub-bands on a power axis of the baseline P-f curve to offer respective frequency regulation services within the frequency contingency deadband.

Optionally, estimating the active power level of each energy storage system comprises: determining whether the measured frequency falls within a first one of the one or more frequency sub-bands; and responsive to the measured frequency falling within the first frequency sub-band, determining an active power level of the energy storage system based, in part, on the P-f curve and the measured frequency level.

Optionally, the model further includes one or more functions for modelling the stored energy at each energy storage system between the one or more frequency deviations.

In an example, the energy storage system may be further connected to a renewable energy power plant. The method may further comprise, in response to detecting the fault condition, triggering one or more control actions at the renewable energy power plant to resolve the fault condition.

Optionally, the one or more control actions include: controlling one or more energy generators, and/or one or more energy consumers, of the power plant to adjust an active power supply to, and/or an active power demand from, the energy storage system.

Optionally, the one or more control actions include at least one of: curtailing the one or more energy generators; and/or using an energy reserve of the one or more energy generators.

In an example, the one or more energy generators may include at least one wind turbine generator.

According to another aspect of the invention there is provided a method of controlling a renewable energy power plant, including an energy storage system, to provide a frequency regulation service for a power network, to which the power plant is connected. The frequency regulation service is provided by controlling the energy storage system, according to one or more regulations of the power network, to counteract frequency deviations within a frequency contingency deadband of the power network for a service period. The energy storage system is one of a plurality of energy storage systems connected to the power network, each energy storage system being operated to counteract the frequency deviations according to the one or more regulations of the power network. The method comprises: determining an estimate of stored energy for each energy storage system at the start of the service period; and during the service period: obtaining a measurement indicative of a frequency level of the power network; detecting a frequency deviation requiring counteraction by the plurality of energy storage systems based on the indicated frequency level; modelling the response, according to the one or more regulations, of each energy storage system to the frequency deviation; estimating a remaining amount of stored energy at each energy storage system; and detecting a fault condition if the estimate of the remaining stored energy at each energy storage system is indicative of an inability of the plurality of energy storage systems to counteract a subsequent frequency deviation.

According to yet another aspect of the invention there is provided a method of controlling a plurality of energy storage systems to provide a frequency regulation service for a power network, to which the energy storage systems are connected. The method involves providing the frequency regulation service by controlling the energy storage system, according to one or more regulations of the power network, to counteract frequency deviations within a frequency contingency deadband of the power network for a service period. The method comprises: determining an estimate of stored energy for each energy storage system at the start of the service period; and during the service period: obtaining a measurement indicative of a frequency level of the power network; detecting a frequency deviation requiring counteraction by the plurality of energy storage systems based on the indicated frequency level; modelling the response, according to the one or more regulations, of each energy storage system to the frequency deviation; estimating a remaining amount of stored energy at each energy storage system; and detecting a fault condition if the estimate of the remaining stored energy at each energy storage system is indicative of an inability of the plurality of energy storage systems to counteract a subsequent frequency deviation.

According to another aspect of the invention there is provided a controller configured to perform the method as described in a previous aspect of the invention. The controller may be an energy storage system controller, a power plant controller, or a grid operator controller, for example.

According to another aspect of the invention, there is provided a computer-readable storage medium comprising instructions that, when executed by a computer, cause the computer to perform the method described above.

Within the scope of this invention it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
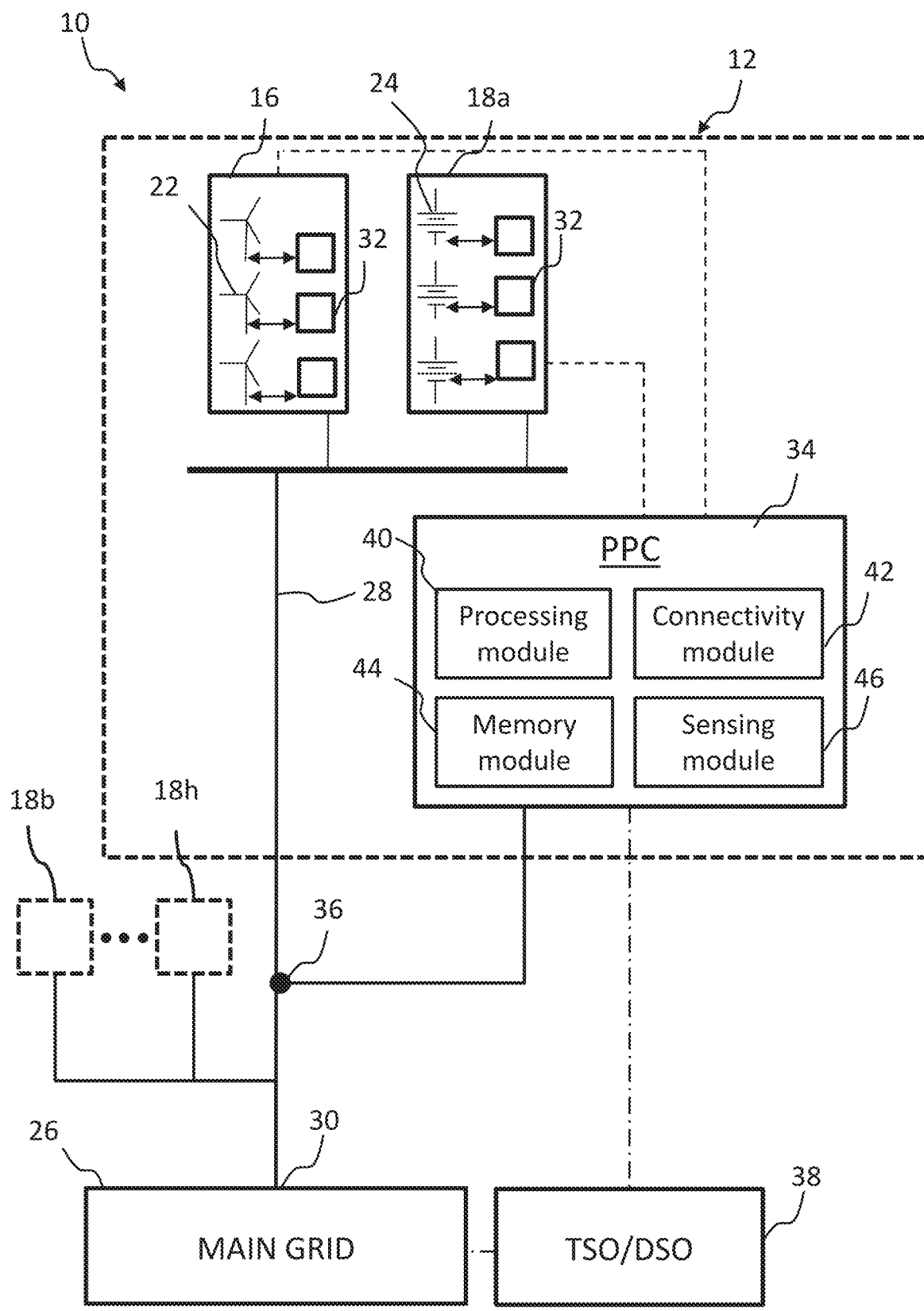
FIG. 1 shows schematically a renewable energy power plant, including an energy storage system and a power plant controller, connected to a power network, along with one or more additional energy storage systems.

Generally, the present invention relates to methods and systems for controlling an energy storage system to provide a frequency regulation service, such as a frequency containment reserve (FCR), for a connected power network while the frequency level remains within the frequency contingency deadband.

In the context of the invention, the energy storage system may be incorporated into a renewable energy power plant, and the energy storage system is one of a plurality of energy storage systems connected to the power network, forming an energy storage pool. Each energy storage system in the pool has agreed, or is configured, to provide the frequency regulation service for a particular service period.

For this purpose, the energy storage system of the power plant may include a plurality of energy storage devices, such as battery units, that are allowed to participate in the frequency regulation services, despite their limited energy resources.

In this respect, the energy market of the connected power network includes regulations (i.e. rules) prescribing how the energy storage systems, and the energy storage devices thereof, must operate in response to frequency deviations from the nominal frequency of the connected power network (within the frequency contingency deadband). The prescribed response is based on the frequency level of the power network and the amount of stored energy at that energy storage system/device. The response is then executed via one or more control schemes, rules, or algorithms programmed into the controller(s) of the individual energy storage systems.

However, in such systems, the stored energy or state of charge of each energy storage system during a particular service period is unknown to the operators of the other energy storage systems, or power plants, and/or to a grid operator or transmission system operator (TSO). Hence, problems can arise when the downregulation reaches an upper limit of the energy storage systems or when the upregulation reaches a lower limit of the energy stores. This may occur, for example, when the grid deviations are particularly one-sided during a service period, e.g. if there is a service period that includes an unusual series of overfrequency deviations or underfrequency deviations.

Advantageously, the methods and systems of the present invention are configured to determine an estimate of the amount of energy stored at each energy storage system at the start of a service period and to detect a fault condition during the subsequent service period if, at any point, an estimate of the stored energy remaining at each energy storage system is indicative of an inability of the plurality of energy storage systems to counteract a subsequent or further frequency deviation, for example by failing to cumulatively provide a threshold power level for counteracting the deviation.

In particular, during the service period, the method involves obtaining a measurement indicative of a frequency level of the power network, which is used to detect a frequency deviation that requires counteraction by the plurality of energy storage systems. Upon detecting such a frequency deviation, the method involves modelling the response of each energy storage system to the frequency deviation, such that the remaining amount of stored energy at each energy storage system can be estimated. In this respect, the response of each energy storage system is governed by the network regulations and a model of the plurality of energy storage systems, i.e. the energy storage pool, may therefore be used to model the response, according to the one or more regulations, of each energy storage system to each frequency deviation. Such a model may include one or more algorithms for estimating an active power level of each energy storage system based on: (i) an indicated frequency level, and (ii) a respective estimate of stored energy at that energy storage system.

The fault condition may then be detected during the service period when the estimates of the stored energy remaining at each energy storage system are: (i) greater than or equal to an upper threshold; and/or (ii) less than or equal to a lower threshold. In this respect, it shall be appreciated that the whole pool of energy storage systems/devices has a tendency to become synchronized at an upper limit or a lower limit due to the prescribed operation of the energy storage systems. A subsequent drop or increase in grid frequency could be substantially unmitigated, at least until secondary resources (e.g. of the power plant(s)) are able to take over. Hence, an upper threshold and a lower threshold may be determined based on the upper and lower limits respectively, to detect the fault condition before the energy storage systems have converged on the upper or lower limit.

In response to detecting the fault condition, the methods and systems of the present invention may execute or trigger one or more control actions to resolve the fault before a subsequent frequency deviation. In this manner, it is expected that the methods and system of the present invention will provide for enhanced grid stability and wider adoption of energy storage systems for providing frequency regulation services within the frequency contingency deadband.

FIG. 1 illustrates an example architecture in which a renewable energy power plant (PP), including an energy storage system, is connected to a main grid or power network, along with one or more additional energy storage systems, forming a pool of energy storage systems. Each of the additional energy storage systems may be incorporated into respective energy storage power stations or power plants, for example. Each energy storage system is configured to provide a frequency regulation service to the connected power network while the frequency level of the power network remains within a normal operational range around a nominal frequency.

In addition to the energy storage system, the PP may also include one or more renewable energy generators, as shown in FIG. 1. In examples, the PP may comprise a single type of renewable energy generator, such as wind turbine generators (WTG)s, or the PP may take the form of a hybrid power plant (HPP), which comprises at least two different types of renewable energy generators, such as a solar power system and a wind power system.

The examples shown in the figures are representative only and the skilled reader will appreciate that other specific architectures of power networks and/or renewable energy power plants are possible.

For the purpose of the following description, each energy storage system takes the of a battery energy storage system (BESS), including one or more battery units. However, while battery energy storage systems and battery units are discussed herein, it will also be appreciated that other forms of energy storage systems may also be included as appropriate, and that the concepts of energy stores connected to the power network described below also apply to other types of energy storage systems, providing such systems are able to provide an acceptable response to a frequency deviation according to respective known frequency service regulations.

The skilled reader will appreciate that the components of the renewable energy power plant and the power network are conventional and as such would be familiar to the skilled reader. It is expected that other known components may be incorporated in addition to, or as alternatives to, the components shown and described in FIG. 1. Such changes would be within the capabilities of the skilled person.

Considering FIG. 1 in more detail, a power system 10 is shown, incorporating the PP 12. The PP 12 includes a wind power system 16, a battery energy storage system 18a and a power plant controller 34, referred to hereafter as PPC 34. The wind power system 16 comprises a plurality of wind turbine generators (WTGs) 22 configured to convert wind energy into electrical energy. A single WTG 22 would also be possible in this system 16. The battery energy storage system 18a comprises a plurality of connected battery units 24, in particular rechargeable batteries, providing centralised or semi-centralised energy stores for the PP 12. For example, the battery energy storage system 18a may include a plurality of electrochemical batteries, such as lithium-ion batteries and/or solid-state batteries for example, operable to store and release electrical energy as required. A single battery unit 24 would also be possible in this system 18a.

The PP 12 is connected to a main grid 26 (also called a main power network) via a connecting network 28. The PP 12 and the main grid 26 are connected at a Point of Interconnection (PoI) 30, which is an interface between the PP 12 and the main grid 26. It should be assumed that references to components being connected or connections between components comprise suitable feeder or transmission lines unless it is otherwise indicated.

The electrical energy supply from the wind power system 16 and/or the energy storage system 18a is transferred via the connecting network 28 to the main transmission network or main grid 26, as active current, for distribution. Electrical energy may also be transferred from the wind power system 16 and/or the main grid 26 to the energy storage system 18a for storage. In this manner, the energy storage system 18a is able to provide both upregulation and downregulation, by varying an active power level (positively or negatively).

In the illustrated example, the PP 12 is connected to the main grid 26 along with one or more additional energy storage systems 18b-18h, forming a pool of energy storage systems 18a-h connected to the main grid 26. Each of the additional energy storage systems 18b-h that be constituted by respective energy storage power stations or incorporated into respective power plants, having a substantially similar arrangement to the PP 12 described herein, for example.

Each battery energy storage system 18a-h therefore comprises a store of energy for supplying active power on demand, known as an active power store, and all or a portion of the active power store may be designated as a reserve for frequency regulation services, such as a frequency containment reserve. In some embodiments, the entire capacity of the battery energy storage systems 18a-h may be for the purpose of frequency regulation services—i.e. the battery systems 18a-h are wholly designed and provided for that purpose—and upper and lower limits of the energy stores may therefore be set respectively at the absolute maximum, i.e. full charge, and minimum, i.e. wholly depleted. However, it shall be appreciated that, in contrast to wind turbine generators 22, the battery energy storage systems 18a-h are non-generating systems, having a limited capacity for receiving and/or supplying active power. Accordingly, as the battery energy storage systems 18a-h require some stored energy or charge to be able to discharge active power, limits may be set aside to provide a reserve for certain situations. For example, maximum and minimum limits of the state of charge of the battery energy storage systems 18a-h may be defined for frequency regulation services, frequency control other than such frequency regulation services, and/or for overall operation of the storage system (other than the absolute maximum, i.e. full charge, and minimum, i.e. wholly depleted).

In the PP 12 of FIG. 1, each of the WTGs 22 and/or the battery units 24 within the systems 16, 18a of FIG. 1 is associated with a respective controller, generally labelled 32. In some embodiments, a sub-set of the WTGs 22 and/or the battery units 24, may share a single, semi-centralised controller, such that there are fewer controllers than power units (a 'power unit' being a reference to a single WTG 22 or battery unit 24 in this context). As would be apparent to the skilled person, the controllers 32 can be considered to be computer systems capable of operating the WTGs 22 and/or the battery units 24 in the manner prescribed herein, and may comprise multiple modules that control individual components of each power unit 22, 24.

During normal operation of the PP 12, the controllers 32 operate the WTGs 22 (and/or the battery units 24) to implement active and reactive current, and/or power, set points received from the power plant controller (PPC) 34, providing frequency and voltage support to the main grid 26.

For this purpose, the PPC 34 is connected to the power network 10 at a Point of Measurement (PoM) 36 and is also connected to each of the systems 16, 18a of the PP 12, for example via the controllers 32. For example, the PPC 34 may be configured to receive one or more measurement signals from the PoM 36 comprising measurements of the power supply from the PP 12 to the main grid 26 and/or a frequency level of the main grid 26 and determine and dispatch corresponding set points to the controllers 32. For this purpose, the PPC 34 may therefore include one or more control schemes, rules, or algorithms.

In this respect, the role of the PPC 34 is to act as a command and control interface between the PP 12 and the grid 26, and more specifically, between the systems 16, 18a and a grid operator or transmission system operator (TSO) 38. The PPC 34 may also receive information regarding the grid 26 and/or connecting network 28 from an energy management system (not shown) or by direct measurement.

The skilled person shall appreciate that the PPC 34 is therefore a suitable computer system for carrying out the controls and commands as described above and so may incorporate a processor 40, a connectivity module 42, a memory module 44, and a sensing module 46.

However, during normal operation of the PP 12, the frequency level of the connected main grid 26 may deviate from a nominal operating frequency of the grid 26, within a normal operating range or frequency contingency deadband. The frequency contingency deadband is generally a small region around the operating frequency. For example, the nominal operating frequency is typically 50 Hz, or in some examples 60 Hz, as measured at the PoI 20 or PoM 24, and upper and lower frequency limits of the frequency contingency deadband may be +/−0.5 Hz.

The deviations may occur in response to a grid fault, for example, and the energy storage systems 18a-h connected to the main grid 26 may provide primary frequency regulation services, including a frequency containment reserve (FCR) service, to counteract deviations from the nominal operating frequency within the frequency contingency deadband.

Typically, each power plant or energy storage system may be operated to provide such frequency regulation services for a limited service period. For example, the operators may offer capacity, and fulfil the reserve requirements, for a yearly, daily, and/or hourly market. Hence, the power plant operator may agree to provide such a frequency regulation service for a 24-hour period (though this example is not intended to be limiting on the scope of the invention).

Accordingly, even while the network frequency remains within the frequency contingent deadband, the energy storage systems 18a-h may support the network by upregulation or downregulation based on a deviation of the current frequency from the network's nominal operating frequency.

Figure 2:
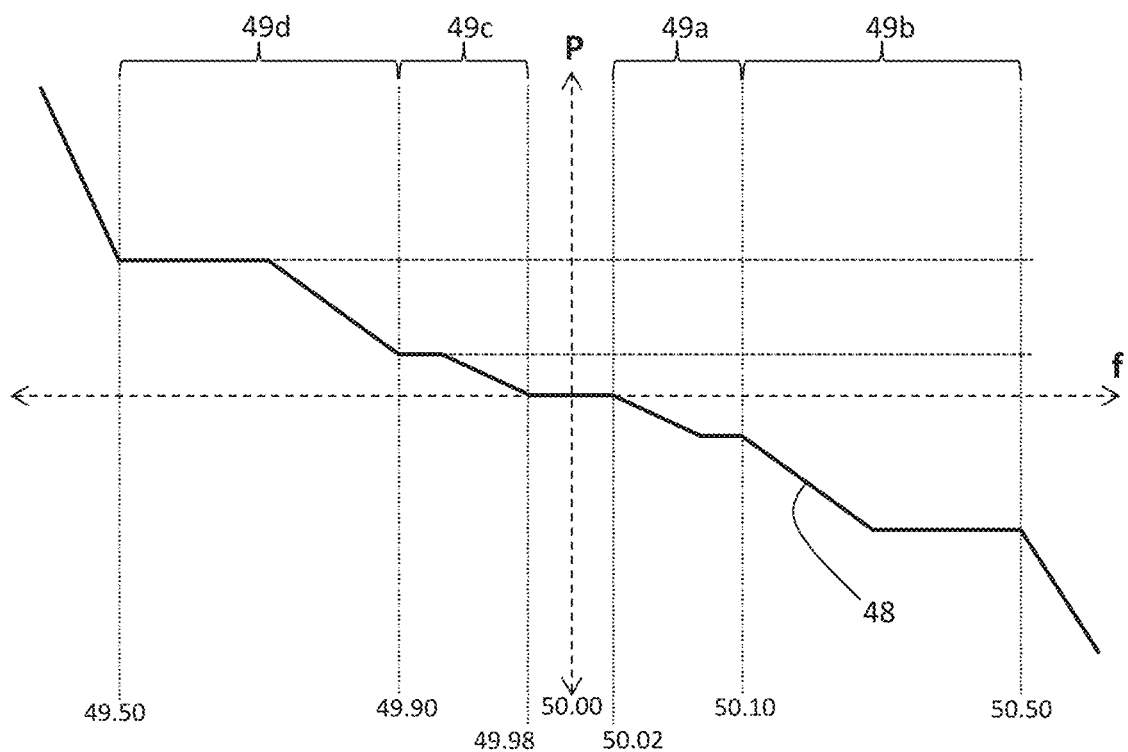
FIG. 2 shows an exemplary P-f curve for determining an active power level to counteract a frequency deviation within a frequency contingency deadband of a power network, such as the power network shown in FIG. 1.

For this purpose, it shall be appreciated that Power-frequency (P-f) curves are commonly used to determine active power setpoints while the frequency level remains within the frequency contingency deadband. FIG. 2 shows an example P-f curve 48 that may be used for this purpose. As shown, the P-f curve 48 may, for example, include the frequency contingency deadband split into a plurality of sub-bands and individual offset curves may be applied to a baseline P-f curve, on a power axis, in one or more of the sub-bands to offer different frequency regulation services within the frequency contingency deadband. For example, as a result of negotiation with grid operator 26, a commercial bidding process, or the like, the operator of the PPC 34 may choose to provide frequency support over each of first to fourth sub-bands 49a-d, where respective offset curves are therefore applied to the baseline P-F curve in each of the first to fourth sub-bands 49a-d, as shown in FIG. 2. Active power set points for the power plant can therefore be determined with reference to the P-f curve 48 to provides upregulation or downregulation in response to frequency deviations. In alternative examples, it shall be appreciated that the power plant operator may choose to provide frequency support over only a subset of possible sub-bands 49a-d. For example, the operator may choose to provide frequency support over only the third and fourth frequency bands 49c-d, in which case the P-f curve used to provide such support may be generated by summing the baseline P-f curve with individual offset curves for each of the third and fourth sub-bands 49c-d.

The methods and systems of the present invention are concerned with the provision of one or more such frequency regulations services by way of the energy storage system 18a. For example, when the frequency increases from the nominal operating frequency, the energy storage system 18a may be operated, along with the other energy storage systems 18b-h, to provide downregulation by reducing a power supply to the main grid 26 and/or by increasing a power supply from the main grid 26 to the energy storage systems 18a-h for storage. Conversely, when the frequency decreases from the nominal operating frequency, the energy storage systems 18a-h may similarly be operated to provide upregulation by increasing a power supply from the energy storage systems 18a-h to the main grid 26 and/or by decreasing a power supply from the main grid 26 to the energy storage systems 18a-h for storage.

In each case, the responses of the energy storage systems 18a-h are controlled to satisfy network-rule based requirements. In particular, the energy market of the connected main grid 26 includes regulations prescribing how individual energy storage systems 18a-h or battery units thereof 24, must operate in response to frequency deviations of the connected power network 26 within the frequency contingency deadband.

In this respect it shall be appreciated that the battery energy storage systems 18a-h may have different amounts of stored energy at the start of the service period, and hence the capacity to supply or receive active power may vary between energy storage systems 18a-h. However, the regulations prescribe that the response of each battery energy storage system 18a-h is based partly on the frequency level of the main grid 26 and partly on the amount of stored energy at that energy storage system 18a-h. In particular, regulations prescribe that the energy storage systems 18a-h having a greater capacity to supply or receive active power provide a greater contribution to the upregulation or downregulation required to counteract the frequency deviation. In other words, the active power level of each energy storage system 18a-h is controlled in a generally proportional manner to the remaining capacity of that energy storage system 18a-h. Hence, the active power level of each energy storage system 18a-h is increased for upregulation, but a greater supply of active power may be provided from the energy storage system 18a of the PP 12 (having more stored energy) than one of the other energy storage systems 18b-h. Similarly, the active power level of each energy storage system 18a-h is reduced for downregulation, for example to receive active power from the grid 26 for storage, but a greater amount of active power is provided to the other energy storage system 18b-h (having less stored energy) than the energy storage system 18a of the PP 12.

The prescribed response is typically executed via one or more control schemes, rules, or algorithms, that may be programmed into the respective battery unit controllers 32. Such control schemes may, for example, involve the use of P-f curves substantially as described above, which may be adjusted further based on the stored energy at the respective energy storage system 18a-h. In this manner, the prescribed rules stored in the controller(s) 32 operate the battery units 24 such that, during a service period, the active power level of each energy storage system 18a-h is based on the frequency level of the main grid 26 and the remaining amount of stored energy at the respective energy storage system 18a-h.

As a consequence of this proportional effort to counteract frequency deviations, the remaining amount of stored energy at each energy storage system 18a-h tends to converge closer together from an initial start point following each frequency deviation. This is generally not a problem, however, if there is an unusually one-side service period, e.g. during which there is a series of many more overfrequency deviations than underfrequency deviations, or vice versa, the remaining amount of stored energy at each energy storage system 18a-h may converge at the upper or lower limit of stored energy (in this example at the upper limit).

Hence, there is a risk in this scenario that the energy storage systems 18a-h are unable to counteract a subsequent frequency deviation, e.g. another overfrequency deviation, and that the frequency deviation would therefore be unmitigated. That is, there is a risk that the energy storage systems 18a-h would fail to cumulatively provide a threshold power level for counteracting the deviation. Consequently, the energy storage systems 18a-h would fail to provide the agreed frequency regulation service, leading to grid faults and possibly fines for the operators.

The methods and systems of the present invention are devised to detect when the energy storage systems 18a-h may be unable to counteract a subsequent frequency deviation and to mitigate such problems.

Figure 3:
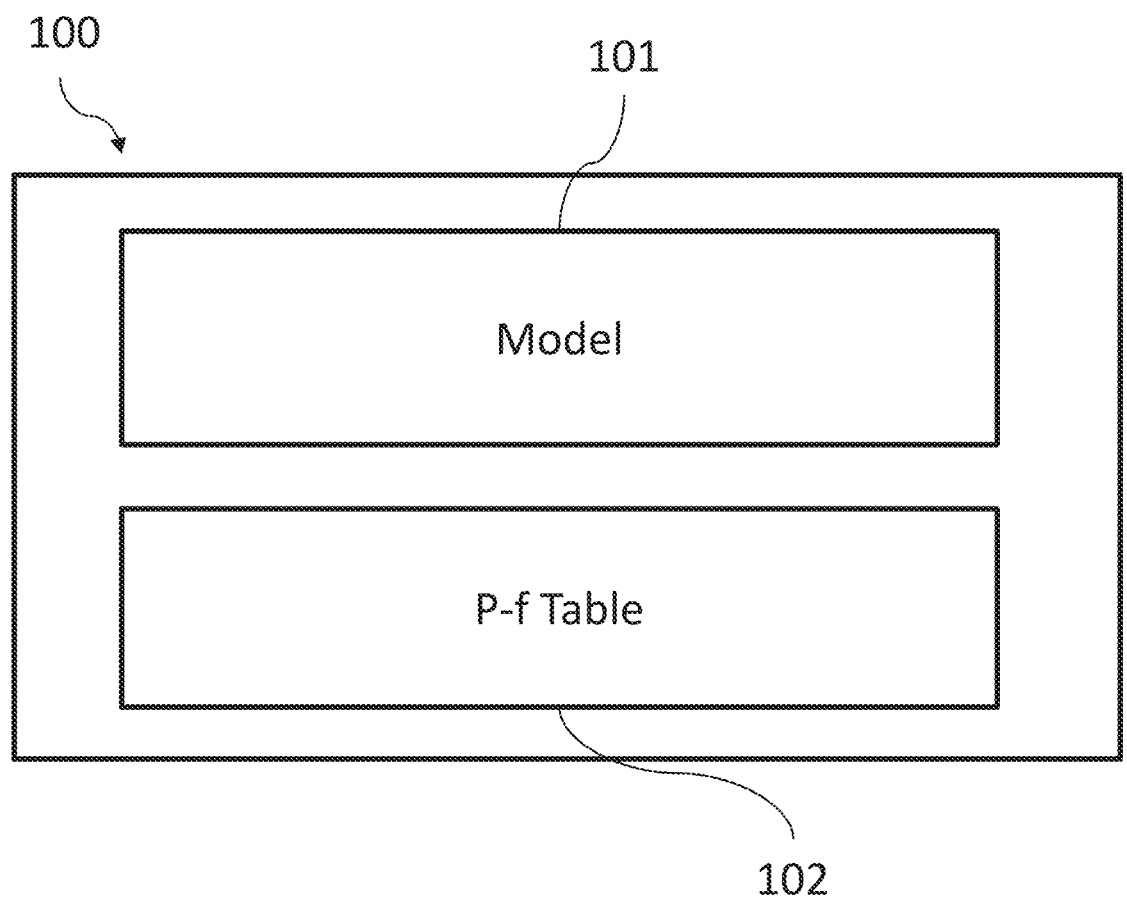
FIG. 3 shows an exemplary system diagram of a controller, in accordance with an embodiment of the invention, of the power plant controller of FIG. 1.

For this purpose, FIG. 3 illustrates a frequency regulation control scheme, algorithm, or "controller" 100, which forms part of the processing module 40 of the PPC 34 for detecting and/or mitigating fault conditions of the energy storage systems 18a-h, and particularly the energy storage system 18a of the PP 12, during a service period.

In particular, the controller 100 is configured to receive or obtain measurements indicative of a frequency level of the connected main grid 26 during a service period, detect one or more frequency deviations requiring counteraction by the energy storage systems 18a-h based on the frequency level; and estimate a remaining amount of stored energy for each energy storage system 18a-h during the service period by modelling the response of each system 18a-h to the one or more frequency deviations.

In order to determine the remaining amount of stored energy for each energy storage system 18a-h, the controller 100 may be configured to determine estimates of the active power level of each energy storage system 18a-h in response to each frequency deviation.

For this purpose, the controller 100 may include a model 101 of the energy storage systems 18a-h, i.e. a model of the pool of battery storage systems 18a-h connected to the main grid 26. The model 101 simulates the prescribed response of the energy storage systems 18a-h to the frequency deviations in accordance with the network-rules. The model 101 may take various forms for modelling the active power levels of the energy storage systems 18a-h and may include one or more rules or algorithms, such as FCR algorithm(s), for estimating an active power level of each energy storage system 18a-h based on: (i) the indicated frequency level of the main grid 26, and (ii) a respective estimate of stored energy at that energy storage system 18a-h. In this context, it shall be appreciated that the rule(s) or algorithm(s) of the model 101 simulate the response of each energy storage system 18a-h connected to the main grid 26 according to the authoritative rule(s) prescribed for the power network 16 dealing with procedure for operating individual battery units, or energy storage systems, to counteract frequency deviations.

During the service period, the model 101 is therefore configured to obtain an indication of the frequency level and a current estimate of the remaining energy stored at each energy storage system 18a-h and determine a corresponding active power level of each energy storage system 18a-h using the algorithm(s). For this purpose, the controller 100 may include one or more look-up tables 102, as shown in FIG. 3, comprising active power target values for respective frequency level measurements and/or pre-determined ramp rates for increasing or decreasing the power level. For example, the look-up table 102 may include a P-f curve, substantially as described previously, for matching the frequency level measurement, (f), to a respective active power target value, P(f). The model 101 may therefore estimate the active power level of each energy storage system 18a-h based on the P-f curve and the estimate of stored energy at that energy storage system 18a-h. One or methods are suitable for this purpose, as may be prescribed by such network regulations, which are not described in detail here to avoid obscuring the invention.

In this manner, the controller 100 can therefore receive or provide an initial estimate of the stored energy at each energy storage system 18a-h and determine a remaining amount of stored energy for each energy storage system 18a-h during the service period by modelling the response of each system 18a-h to one or more frequency deviations during the service period. In examples, the initial estimates of the stored energy at each energy storage system 18a-h may be based on direct measurements received at the PPC 34. Alternatively or additionally, the initial estimates may be computationally derived by the controller 100, for example by using one or more probabilistic functions. In particular, the controller 100 may for example, receive the energy capacity of each energy storage systems 18a-h, and/or historical data relating to the energy stores, and estimate the energy stored at each energy storage system 18a-h by applying one or more probabilistic functions known to the skilled person. For example, one or more probabilistic functions may be used to estimate the percentage of the energy storage capacity that is stored at each energy storage system 18a-h at the start of the service period, and thereby derive an estimate of initial stored energy. For example, the percentage of the energy capacity may be estimated using a random distribution, a binomial distribution, and/or a Poisson distribution, or the controller 100 may use historical data relating to the energy stores.

The operation of the controller 100 shall now be described with additional reference to FIGS. 4 to 6.

For example, the operators of the PP 12, and each energy storage system 18a-h, may have agreed to fulfil the reserve requirements of the main grid 26 for a service period of 24 hours.

Each energy storage system 18a-h is therefore controlled to provide a frequency regulation service, such as a frequency containment reserve (FCR), to counteract frequency deviations within the frequency contingency deadband during the service period by controlling a respective active power level according to the regulation(s) of the main grid 26.

Accordingly, the controllers of the energy storage systems 18a-h, such as the battery unit controllers 32, may operate the energy storage systems 18a-h to provide upregulation and downregulation to counteract frequency deviations of the network frequency during the service period in accordance with the network prescribed regulations. The active power level of each energy storage system 18a-h is therefore based on the measured frequency level and the active power level varies between the energy storage systems 18a-h as a function of the stored energy remaining at each energy storage system 18ah.

Figure 4:
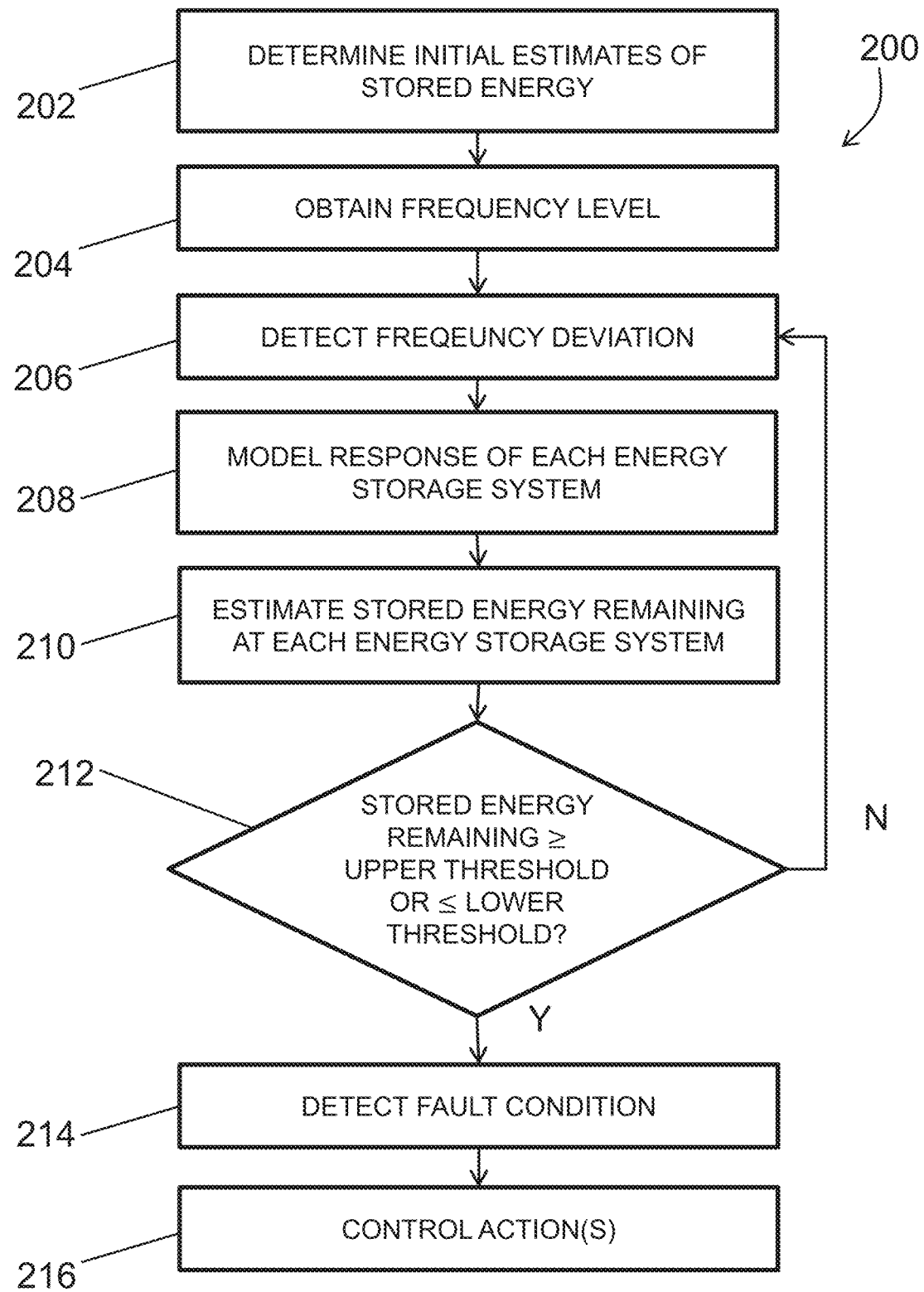
FIG. 4 shows an exemplary method of controlling the power plant shown in FIG. 1, in accordance with an embodiment of the invention.

At the same time, in order to reduce the risk of unmitigated frequency deviations during the service period, the PPC 34 operates the controller 100 according to the method 300 shown in FIG. 4.

FIG. 4 shows an example method 200 of controlling the controller 100 to mitigate faults of the energy storage system 18a during the service period.

Accordingly, at the start of the service period the controller 100 determines an initial estimate of the stored energy at each energy storage system 18a-h, in step 202.

In an example, the controller 100 may therefore receive the stored energy, i.e. the state of charge, of one or more of the energy storage systems 18a-h or recall such measurements from the memory module 44 of the PPC 34. In another example, the initial estimates of the stored energy at each energy storage system 18a-h may be computationally derived. For example, the initial estimates of the stored energy at each energy storage system 18a-h may be determined by estimating a percentage of the energy capacity of each energy storage system 18a-h held as stored energy using one or more probability functions. For example, the controller 100 may determine the initial estimates using a binomial distribution to indicate the percentage of energy stored at each energy storage system 18a-h.

It shall be appreciated that the accuracy of the initial estimates has a relatively minor impact on the ability of the controller 100 to accurately detect the fault condition, as the regulations prescribe that the active power response of each energy storage system 18a-h to a frequency deviation is proportional to the amount of energy stored at that energy storage system 18a-h, as shall be discussed in more detail below.

In step 204, the controller 100 receives or obtains a measurement indicative of the frequency level of the main grid 26 and may determine that the frequency level is within the frequency deadband, such that any frequency deviations within that deadband will be counteracted by the primary frequency regulations services provided by the energy storage systems 18a-h.

In step 206, the controller 100 may detect a frequency deviation that requires counteraction by the energy storage systems 18a-h based on the indicated frequency level. For example, the controller 100 may detect an overfrequency deviation, where the frequency level increases above the nominal operating frequency (which may be 50 Hz for example), or the controller 100 may detect an underfrequency deviation, where the frequency level falls below the nominal operating frequency.

In response to the frequency deviation, the energy storage systems 18a-h are operated according to the prescribed regulations to counteract the frequency deviation by upregulation or downregulation. For example, the controllers 32 may operate the battery units 24 to counteract the frequency deviation by upregulation or downregulation—supplying active power to the main grid 26 or receiving active power therefrom according to the prescribed network requirements.

In step 208, the controller 100 therefore models the response of each energy storage system 18a-h to the detected frequency deviation in order to estimate a remaining amount of stored energy at each energy storage system 18a-h, in step 210.

For this purpose, the controller 100 may use the model 101 and estimate an active power level of each energy storage system 18a-h during the frequency deviation based on the indicated frequency level and the current or previous estimate of stored energy at the energy storage system 18a-h.

It shall be appreciated that the estimate of stored energy at energy storage system 18a-h, used in step 208, may correspond to the initial estimate, determined in step 202, for the first frequency deviation and thereafter the estimate of the remaining available may be determined, at least in part, by adjusting that initial estimate based on the estimated active power level of the energy storage system 18a-h in response to each frequency deviation. The controller 100 may also include one or more rules or algorithms for modelling or estimating the stored energy at each energy storage system 18a-h between frequency deviations. For example, the controller 100 may include one or more rules that the stored energy at each energy storage system 18a-h remains constant between frequency deviations or rules prescribing how the stored energy increases or decreases between frequency deviations, for example to provide one or more other services. The current or previous estimate of stored energy at each energy storage system 18a-h may therefore be provided as an input to the model 101 along with the indicated frequency level during the frequency deviation to determine a respective active power level of each energy storage system 18ah and, in turn, to determine an estimate of the stored energy remaining at each energy storage system 18a, 18b.

In step 212, the controller 100 may compare the estimates of the stored energy remaining at each energy storage system 18a-h to an upper and/or a lower energy threshold to determine whether the energy storage systems 18a-h are able to counteract a subsequent frequency deviation (i.e. whether the energy storage systems 18a-h are able to cumulatively provide a prescribed minimum threshold power level for counteracting frequency deviations). For example, the controller 100 may determine each of the upper and lower thresholds based on the upper and lower limits for the frequency regulation service to provide a margin that is indicative of an ability to counteract a subsequent frequency deviation. In this respect, it shall be appreciated that the stored energy of the energy storage systems 18a-h will converge on the upper and lower limits if there is a series of one-sided frequency deviations (i.e. a series of overfrequency or underfrequency deviations), in particular since the network regulations prescribe that the active power level of each energy storage system 18a-h is partly based on the remaining capacity. This leads to the risk of unmitigated frequency deviations once the stored energy converges on the upper or lower limit.

Accordingly, the upper and lower thresholds used, in step 212, for detecting the fault condition are based on the upper and lower limits respectively, in order to detect that each energy storage system 18a-h is too close to the upper or lower limit to safely guarantee mitigation of subsequent frequency deviation. For example, the upper threshold may be set as 95% of the upper limit and the lower threshold may be set as 5% of the upper threshold or an offset from the lower threshold by 5% of the difference between the upper and lower threshold.

If the estimated stored energy at each energy storage system 18a-h is between the upper and lower thresholds, the controller 100 returns to step 206 and detects the next frequency deviation. The controller 100 therefore repeats steps 206 to 212 to estimate the stored energy remaining at each energy storage system 18a-h during the service period and compare the estimates to the upper and/or lower thresholds, to check for a fault condition.

If the estimated stored energy at each energy storage system 18a-h is greater than or equal to the upper threshold or less than or equal to the lower threshold, the controller 100 proceeds to detect a fault condition, in step 214.

This may be expected when the service period is unusually one-sided, for example where there is an unusual series of overfrequency deviations, with relatively few underfrequency deviations to reduce the amount of energy stored, or vice vera.

It shall be appreciated that the controller 100 detects the fault condition when each of the energy storage systems 18a-h reaches the upper or lower threshold.

Figure 5:
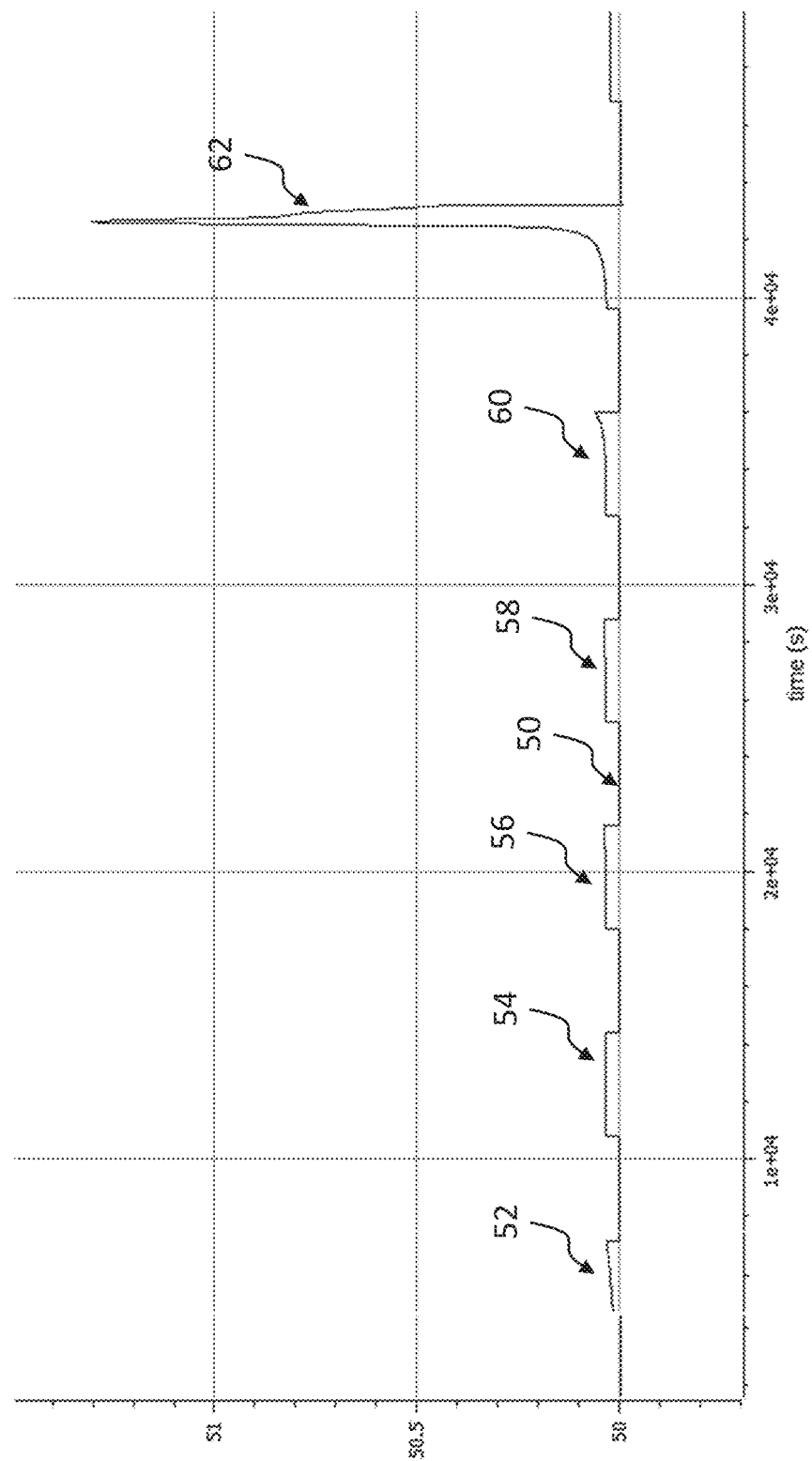
FIG. 5 shows a frequency level of a power network, such as the power network shown in FIG. 1, during an exemplary frequency regulation service period.
Figure 6:
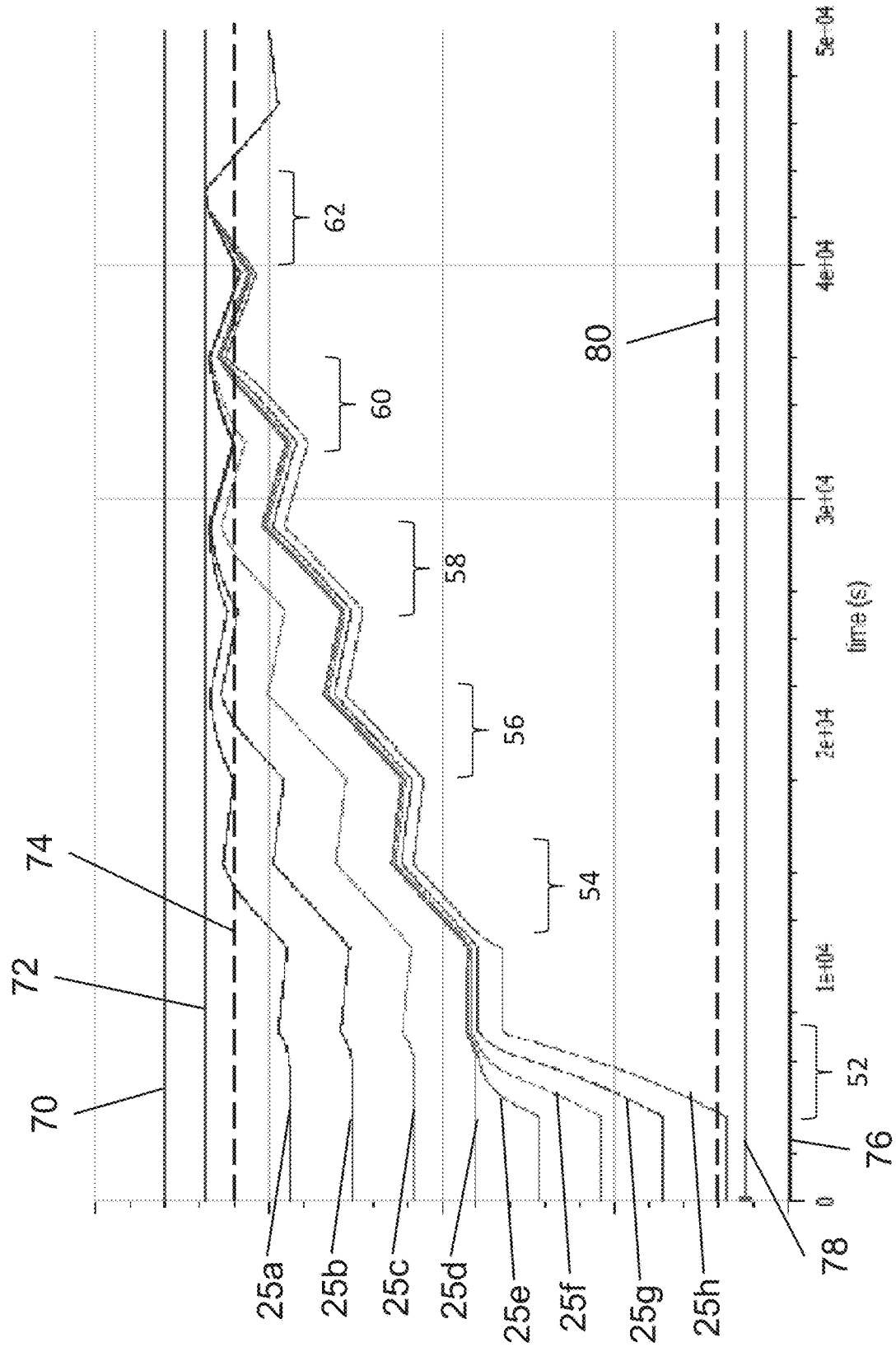
FIG. 6 shows an estimate of the stored energy remaining at each energy storage system of an exemplary pool of energy storage systems connected to the power network, shown in FIG. 1, during the frequency regulation service period, shown in FIG. 5.

By way of example, FIGS. 5 and 6 show the estimates of stored energy at each energy storage system 18a-h of an example pool of systems connected to the main grid 26 during an example service period where a fault condition is detected.

FIG. 5 shows the measured or indicated frequency level 50 of the main grid 26 during an example service period. As shown in FIG. 5, the service period includes a series of overfrequency deviations, including first, second, third, fourth, fifth and sixth overfrequency deviations 52, 54, 56, 58, 60, 62. The first to fifth frequency deviations 52-60 are counteracted by the energy storage systems 18a-h for example by transferring active power from the main grid 26 to the energy storage systems 18a-h. However, the sixth frequency deviation 62 is an unmitigated deviation, where the energy storage systems 18a-h are unable to counteract the frequency deviation and, instead, secondary frequency containment resources are required, as shall be discussed in more detail.

FIG. 6 is a graph showing the estimate of stored energy at each energy storage system 18a-h of an example pool of storage systems, as determined in step 210, during the service period shown in FIG. 5.

In this example, the energy storage systems includes first, second, third, fourth, fifth, sixth, seventh, and eighth energy storage systems 18a-h where the respective estimates of stored energy are depicted by respective first to eighth lines 25a-h in FIG. 6.

The absolute maximum capacity of each energy storage system 18a-h is shown by the ninth line 70, an upper limit for the frequency regulation service of each energy storage system 18a-h is shown by the tenth line 72 and the upper threshold used for detecting the fault condition is shown by the eleventh line 74. Similarly, the empty state of each energy storage system 18a-h is depicted by the twelfth line 76, the lower limit for the frequency regulation service of each energy storage system 18a-h is shown by the thirteenth line 78 and the lower threshold used for detecting the fault condition is shown by the fourteenth line 80.

As shown in FIG. 6, at the start of the service period, the controller 100 estimates the initial amount of stored energy at each of the energy storage systems 18a-h, as described in step 202. In this example, it is shown that the initial estimates of stored energy reduce from the first to the eighth energy storage systems 18a-h. For example, the controller 100 may have been provided with indications of the energy storage capacity of each energy storage system 18a-h at the start of the service period and the controller 100 may apply one or more functions for estimating initial percentages of stored energy at each energy storage system 18a-h according to a probability function such that the stored energy reduces from the first to eight energy storage systems 18a-h.

As shown in FIG. 6, the estimate of stored energy at each energy storage system 18a-h remains substantially constant until the first frequency deviation 52 is detected, in step 206, which requires counteraction by the energy storage systems 18a-h. The controller 100 models the response of each energy storage system 18a-h to the first frequency deviation 52, in step 208, using the model 101 to estimate the active power level of each energy storage system 18a-h based on the measured frequency level 50. As shown In FIG. 6, the active power level of each energy storage system 18a-h reduces to counteract the overfrequency deviation 52, thereby increasing the supply of power from the main grid 26 to the energy storage systems 18a-h and increasing the estimated amount of stored energy at each energy storage system 18a-h. Furthermore, as shown in FIG. 6, in accordance with the network regulation(s), the model 101 estimates a greater supply of active power to the eighth energy storage system 18h than the active power supply to the first energy storage system 18a since the amount of stored energy stored at the eighth energy storage system 18h is considerably lower than at the first energy storage system 18a. Indeed, the relative increase in the stored energy at each energy storage system 18a-h is shown to increase from the first to the eighth energy storage systems 18a-h in response to the first frequency deviation 52, thereby reducing the difference between the amounts of stored energy at each energy storage system 18a-h following the frequency deviation. As the stored energy at each energy storage system 18a-h remains below the upper threshold shown by the eleventh line 74, the controller 100 does not detect a fault condition in step 212 and instead detects the second frequency deviation 54, in step 206.

Again, the controller 100 models the response of each energy storage system 18a-h to the second frequency deviation 54, in step 208, using the model 101 and determines that the stored energy at each energy storage system 18a-h increases again, in step 210, whilst remaining below the upper threshold.

This is repeated for each of the third to fifth deviations 56 to 60 and the controller 100 may include one or more rules or algorithms for modelling the amount of stored energy at each energy storage system 18a-h between frequency deviations. For example, between frequency deviations the controller 100 may be configured to assume that the stored energy at each energy storage system 18a-h remains constant or may reduce at a constant rate as shown in this example.

As shown in FIG. 6, the estimated stored energy at each energy storage system 18a-h therefore converges towards the upper limit, shown by the tenth line 72, in response to the first to fifth frequency deviations 52 to 60, and the controller 100 may therefore determine, in step 212, that the remaining energy at each energy storage system 18a-h is greater than the upper threshold following the fifth deviation 60. In particular, as shown in FIG. 6, following the fifth frequency deviation 60, the stored energy at each energy storage system 18a-h (shown by the first to eighth lines 25a-h) is greater than the upper threshold (shown by the eleventh line 74). Accordingly, the controller 100 may detect a fault condition, in step 214.

If no control action is taken in response to the detected fault condition, then the remaining stored energy at each energy storage system 18a-h may converge onto the upper limit (shown by the eleventh line 72) during the sixth frequency deviation 62 and, in response, the sixth frequency deviation 62 is unmitigated, as shown in FIG. 5, increasing outside of the frequency contingency deadband. In this respect, the energy storage systems 18a-h would fail to provide the agreed frequency regulation service, leading to grid faults and possibly fines for the operators.

In examples, to mitigate such problems, the method 200 of operating the controller 100 further includes a step of executing or triggering one or more control actions, in step 216, in response to detecting the fault condition, in step 214.

In particular, returning to FIG. 4, the controller 100 may be configured to execute or trigger one or more control actions, in step 216, to resolve the fault condition before a further frequency deviation occurs. For example, the controller 100 may determine and dispatch active power set points for curtailing the WTGs 22 of the PP 12 and use the energy storage systems 18a-h to supply the power shortage to the main grid 26, and thereby satisfy a reference power level demand of the main grid 26. In this manner, the stored energy at each energy storage system 18a-h may be reduced below the upper threshold to increase the capacity for subsequent frequency deviations, whilst ensuring grid stability. In examples, it shall be appreciated that the controller 100 may instead determine and dispatch active power set points to the WTGs 22 to use a spinning reserve of the WTGs, and supply the additional power to the energy storage systems 18a-h for storage, thereby increasing the stored energy at the energy storage system 18a, or each energy storage system 18a-h, above the lower threshold. Alternatively, the controller 100 may purchase or acquire additional power from another system or plant, for example.

It shall be appreciated that the changes imparted by the control actions may be further captured by the model of the energy storage systems 18a-h and used by the controller 100 to detect subsequent fault conditions.

In this manner, it is envisaged that will provide for enhanced grid stability and wider adoption of the use of energy storage systems for providing frequency regulation services within the frequency contingency deadband.

It will be appreciated that various changes and modifications can be made to the examples described above without departing from the scope of the present invention.

For example, the skilled person will appreciate that references to periods such as hours or days in the preceding paragraphs are examples only, and any other suitable time period or periods may be used depending upon the implementation.

Furthermore, although the invention has been described in the context of a method executed by a power plant controller of a renewable energy power plant, it shall be appreciated that, in other examples, the method may be executed by a dedicated energy storage system controller, or by a grid operator or the TSO 38, for example where adjusted power reference levels may be dispatched accordingly.

In this context, the invention is advantageous in that the TSO 38 is interested in estimating the stored energy within the pool of energy storage systems 18a-h and the ability thereof to counteract frequency deviations, as there is no communication from the energy storage systems 18a-h to the TSO 38 about anything operational. Instead, the only communication between the energy storage systems 18a-h and the grid is through the measurement of grid frequency. The energy storage system operators agree on timeslots for providing FCR services, once accepted, the operator is then obligated to provide that service in that time slot. However, the TSO 38 currently has no way of noticing, in real time, if a specific energy storage system 18a-h is not satisfying the obligations. If an energy storage system operator is found to not meet its obligations, it risks getting prohibited from participating in the FCR bids again. Estimating the stored energy of each energy storage system 18a-h that is participating during a specific time slot is therefore valuable to the TSO 38, as it allows the TSO 38 to take corrective action before the primary frequency reserves are depleted. For example by requesting increased or decreased power production from the secondary resources.

The methods and controllers described herein are therefore also advantageous in the context of a method of controlling a plurality of energy storage systems connected to a power network to provide frequency regulations services, such as FCR, to that power network.

The invention claimed is:

1. A method of controlling an energy storage system to provide a frequency regulation service for a power network, to which the energy storage system is connected, by controlling the energy storage system, according to one or more regulations of the power network, to counteract frequency deviations within a frequency contingency deadband of the power network for a service period, the energy storage system being one of a plurality of energy storage systems connected to the power network, each being operated to counteract the frequency deviations according to the one or more regulations of the power network, the method comprising:
    determining an estimate of stored energy for each energy storage system at a start of the service period;
    during the service period:
        obtaining a measurement indicative of a frequency level of the power network;
        detecting a frequency deviation requiring counteraction by the plurality of energy storage systems based on the indicated frequency level;
        estimating a remaining amount of stored energy at each energy storage system by applying a model to (i) the estimate of stored energy for each energy storage system at the start of the service period and (ii) the frequency deviation; and
        detecting a fault condition if the estimate of the remaining stored energy at each energy storage system is indicative of an inability of the plurality of energy storage systems to counteract a subsequent frequency deviation; and
    increasing or reducing an amount of stored energy for the energy storage system in response to detecting the fault condition.

2. The method according to claim 1, wherein the fault condition is detected if the estimate of the remaining stored energy at each energy storage system is: (i) greater than or equal to an upper threshold (ii) less than or equal to a lower threshold.

3. The method according to claim 2, further comprising determining the upper threshold or the lower threshold for each energy storage system based on an upper energy limit or a lower energy limit for the frequency regulation service.

4. The method according to claim 1, wherein the estimate of stored energy for each energy storage system is determined by measurement.

5. The method according to claim 1, wherein the estimate of stored energy for each energy storage system is determined based on one or more probabilistic functions.

6. The method according to claim 5, wherein the one or more probabilistic functions include at least one of:
    a random distribution;
    a binomial distribution;
    a (discrete) uniform distribution; and/or
    a Poisson distribution.

7. The method according to claim 1, wherein the model models a response, according to the one or more regulations, of each energy storage system to the frequency deviation, the model including one or more algorithms for estimating an active power level of each energy storage system based on: (i) the indicated frequency level of the connected power network and (ii) a respective estimate of stored energy at that energy storage system.

8. The method according to claim 7, wherein the model includes one or more power-frequency (P-f) curves for estimating the active power level of each energy storage system, each P-f curve comprising a baseline P-f curve for the frequency contingency deadband split into one or more sub-bands, wherein individual offset curves are applied to one or more of the sub-bands on a power axis of the baseline P-f curve to offer respective frequency regulation services within the frequency contingency deadband.

9. The method according to claim 8, wherein estimating the active power level of each energy storage system comprises:
    determining whether the measured frequency falls within a first one of the one or more frequency sub-bands; and
    responsive to the measured frequency falling within a first frequency sub-band, determining an active power level of the energy storage system based, in part, on the P-f curve and the measured frequency level.

10. The method according to claim 7, wherein the model further includes one or more functions for modelling the stored energy at each energy storage system between the one or more frequency deviations.

11. The method according to claim 1, wherein increasing or reducing the amount of stored energy for the energy storage system comprises controlling one or more energy generators or one or more energy consumers of a renewable energy power plant connected to the energy storage system to adjust an active power supply to or an active power demand from the energy storage system.

12. The method according to claim 11, wherein controlling the one or more energy generators comprises at least one of:
  curtailing the one or more energy generators; or
  using an energy reserve of the one or more energy generators.

13. The method according to claim 11, wherein the one or more energy generators include at least one wind turbine generator.

14. An energy storage system controller configured to perform an operation of controlling an energy storage system to provide a frequency regulation service for a power network, to which the energy storage system is connected, by controlling the energy storage system, according to one or more regulations of the power network, to counteract frequency deviations within a frequency contingency deadband of the power network for a service period, the energy storage system being one of a plurality of energy storage systems connected to the power network, each being operated to counteract the frequency deviations according to the one or more regulations of the power network, the operation comprising:
  determining an estimate of stored energy for each energy storage system at a start of the service period; and
  during the service period:
    obtaining a measurement indicative of a frequency level of the power network;
    detecting a frequency deviation requiring counteraction by the plurality of energy storage systems based on the indicated frequency level;
    estimating a remaining amount of stored energy at each energy storage system by applying a model to (i) the estimate of stored energy for each energy storage system at the start of the service period and (ii) the frequency deviation; and
    detecting a fault condition if the estimate of the remaining stored energy at each energy storage system is indicative of an inability of the plurality of energy storage systems to counteract a subsequent frequency deviation; and
  increasing or reducing an amount of stored energy for the energy storage system in response to detecting the fault condition.

* * * * *